United States Patent
Daniel

(10) Patent No.: US 6,622,014 B1
(45) Date of Patent: Sep. 16, 2003

(54) METHOD FOR AUTHORIZING A COMMUNICATION BETWEEN AT LEAST TWO DEVICES

(75) Inventor: Patrick Daniel, Lipsheim (FR)

(73) Assignee: Alcatel, Paris (FR)

( * ) Notice: Subject to any disclaimer, the term of this patent is extended or adjusted under 35 U.S.C. 154(b) by 353 days.

(21) Appl. No.: 09/688,710

(22) Filed: Oct. 17, 2000

(30) Foreign Application Priority Data

Oct. 29, 1999 (EP) .............................................. 99440291

(51) Int. Cl.[7] .............................................. H04M 3/16
(52) U.S. Cl. ...................... 455/411; 455/410; 455/422; 455/462; 455/465; 340/825.31; 340/825.34; 380/247; 380/270
(58) Field of Search ................................ 455/410, 411, 455/422, 462, 465; 340/825.31, 825.34; 380/247, 270, 271; 379/188, 189

(56) References Cited

U.S. PATENT DOCUMENTS 5,274,368 A * 12/1993 Breeden et al. .............. 340/7.2
5,737,701 A * 4/1998 Rosenthal et al. ........... 455/411
5,970,405 A    10/1999 Kaplan et al.
6,091,946 A * 7/2000 Ahvenainen ................. 455/411
6,148,192 A * 11/2000 Ahvenainen ................. 455/410
6,466,780 B1 * 10/2002 Geiselman et al. .......... 455/411

FOREIGN PATENT DOCUMENTS

EP         0 556 468 A2    8/1993

* cited by examiner

*Primary Examiner*—William Trost
*Assistant Examiner*—Danh Le
(74) *Attorney, Agent, or Firm*—Sughrue Mion, PLLC

(57) ABSTRACT

Known telecommunication systems like a DECT-system comprising a base-station and a handset or like a Digital Home Network system comprising a controller and several devices or a car radio system comprising a car radio and a front are based upon an authorisation process for introducing a new device or for coupling an already introduced but decoupled old device to said telecommunication system. Such authorisation process, which often is user-unfriendly, can be partially or even completely avoided by either using the result of an old identification process or by using a new identification process for identifying a user, which can be done in a much more user-friendly way.

19 Claims, 2 Drawing Sheets

METHOD FOR AUTHORIZING A COMMUNICATION BETWEEN AT LEAST TWO DEVICES

BACKGROUND OF THE INVENTION

The invention relates to a method for authorising a communication between at least two devices in a telecommunication system and comprising the step of performing an authorisation process, whereby a decision for authorising or not authorising said communication is taken in dependence of at least a part of at least one process.

Such a method is generally known. For example, said telecommunication system is an existing DECT-system, with said devices being DECT-devices, a first device in the form of one or more DECT-base-stations and/or one or more DECT-handsets and a second device in the form of another, new DECT-handset which is to be added to the existing DECT-system by inputting long manufacturer codes which are to be checked by said existing DECT-system. Such a time-consuming authorisation process is necessary to prevent fraud. Or, for example, said telecommunication system is a car radio system, comprising a first device in the form of a car radio without a front, and a second device in the form of said front. After installation of said front, a pin-code must be entered, before said radio can be used, another time-consuming authorisation process.

Such a method is disadvantageous, inter alia, due to being user-friendly insufficiently as a consequence of said authorisation processes taking too much time.

SUMMARY OF THE INVENTION

It is an object of the invention, inter alia, to provide a method which is more user-friendly.

Thereto, the method according to the invention is characterised in that said method comprises the step of performing an identification process, whereby said decision is taken in dependence of at least a part of said identification process and independently of at least a part of said authorisation process.

By using said identification process for avoiding at least a part of said authorisation process, the user-friendlyness is increased a lot.

In a system like for example a DECT-system said identification process could be realised by providing said first device (like for example a DECT-base-station and/or a DECT-handset) with a smart card reader or a keyboard for receiving a user-code or a voice recogniser or a finger print reader etc. for analysing a smart card or a user-code or voice or a finger print etc. for identification purposes. In a system like for example a car radio system said identification process could further be realised by using the identification between the motor-management-system and the ignition key.

The invention is based on the insight, inter alia, that when user-identification has taken place, at least a part of device-authorisation has become superfluous.

The invention solves the problem, inter alia, of providing a method for coupling devices having a mutual confidential relationship in a user-friendly way without endangering the confidential character.

The invention further relates to a telecommunication system comprising a first device to be coupled to a second device, which telecommunication system comprises an authorisation receiver for receiving an authorisation-signal and comprises a processor for performing an authorisation process in dependence of at least said authorisation-signal and for taking a decision for authorising or not authorising a communication between both devices in dependence of at least one process.

The telecommunication system according to the invention is characterised in that said telecommunication system comprises an identification receiver for receiving an identification-signal, with said processor performing an identification process in dependence of at least said identification-signal and taking said decision in dependence of at least a part of said identification process and independently of at least a part of said authorisation process.

A first embodiment of the telecommunication system according to the invention is characterised in that said first device comprises a first transceiver and said second device comprises a second transceiver for exchanging signals between both devices.

Both transceivers can be based upon wireless technology (like for example a DECT-system) and/or upon wired technology (like for example a car radio system), whereby it should not be excluded that in a system based upon wireless technology said authorisation and/or identification process is realised via a wired connection and that in a system based upon wired technology said authorisation and/or identification process is realised via a wireless connection.

A second embodiment of the telecommunication system according to the invention is characterised in that said telecommunication system comprises a network coupled to said first device.

Said network can be located either at a first position at one side of said first device with said second device being at the other side of said first device (for example in case of both devices belonging to a DECT-system which is coupled to a Digital Home Network via a controller in the form of a gateway and/or server, or for example in case said first device is said controller in the form of a gateway and/or server of said Digital Home Network with said second device being one of the several devices of said Digital Home Network), or can be located at a second position between both devices (for example in case of said first device being a base-station (DECT/GSM/DCS/CTS etc.) with said second device being a handset (DECT/GSM/DCS/CTS etc.), or at both positions. Further, a first network could be at said first location, and a second network could be at said second position.

A third embodiment of the telecommunication system according to the invention is characterised in that said network comprises said processor and said identification receiver.

In this case in said network said authorisation process and said identification process take place, whereby said authorisation receiver can be located either in said network or in one of said devices, whereby for each receiver located in said network it should not be excluded that (identification and/or authorisation) signals arrive via a device.

A fourth embodiment of the telecommunication system according the invention is characterised in that said first device comprises said processor and said identification receiver.

In this case in said first device said authorisation process and said identification process take place, whereby said authorisation receiver can be located either in said network or in one of said devices, whereby for each receiver located in a device it should not be excluded that (identification and/or authorisation) signals arrive via a network.

A fifth embodiment of the telecommunication system according the invention is characterised in that said network comprises said processor, with said first device comprising said identification receiver.

In this case in said network said authorisation process and said identification process take place, whereby said authorisation receiver can be located either in said network or in one of said devices, whereby identification signals arrive via said first device, and whereby authorisation signals may arrive either via a network or via a device.

A sixth embodiment of the telecommunication system according the invention is characterised in that said network comprises said identification receiver, with said first device comprising said processor.

In this case in said first device said authorisation process and said identification process take place, whereby said authorisation receiver can be located either in said network or in one of said devices, whereby identification signals arrive via a network, and whereby authorisation signals may arrive either via a network or via a device.

It should not be excluded, however, that for said identification process a first, identification processor is used and that for said authorisation process a second, authorisation processor is used, whereby each one of them can be located as described before, thereby offering the possibilities and advantages as described before.

The invention further relates to a first device to be coupled to a second device, which first device comprises a processor for performing an authorisation process in dependence of at least an authorisation-signal to be received via an authorisation receiver and for taking a decision for authorising or not authorising a communication between both devices in dependence of at least one process.

Said first device according to the invention is characterised in that said processor is adapted to perform an identification process in dependence of at least an identification-signal to be received via an identification receiver and to take said decision in dependence of at least a part of said identification process and independently of at least a part of said authorisation process.

A first embodiment of the first device according to the invention is characterised in that said first device comprises said second device.

Again, it should not be excluded, that for said identification process a first, identification processor is used and that for said authorisation process a second, authorisation processor is used, whereby said first, identification processor and/or said identification receiver and/or said authorisation receiver could be located inside or outside said first device and whereby said first device at least comprises said second, authorisation processor for performing said authorisation process in dependence of at least said authorisation-signal to be received via said authorisation receiver (located inside or outside said first device) as well as for taking said decision for authorising or not authorising said communication between both devices in dependence of at least said part of said identification process and independently of at least said part of said authorisation process.

The documents EP99440202.2, EP99440201.4 and EP99440203.0 all disclose systems related to a Digital Home Network, neither one of these documents discloses the telecommunication system according to the invention. All references including further references cited with respect to and/or inside said references are considered to be incorporated in this patent application.

BRIEF DESCRIPTION OF THE DRAWINGS

The invention will be further explained at the hand of embodiments described with respect to drawings, whereby FIG. 1 discloses a flow chart of method according to the invention for authorising a communication between at least two devices in a telecommunication system, FIG. 2 discloses a telecommunication system according to the invention comprising a first device to be coupled to a second device.

DETAILED DESCRIPTION OF THE INVENTION

Figure 1:
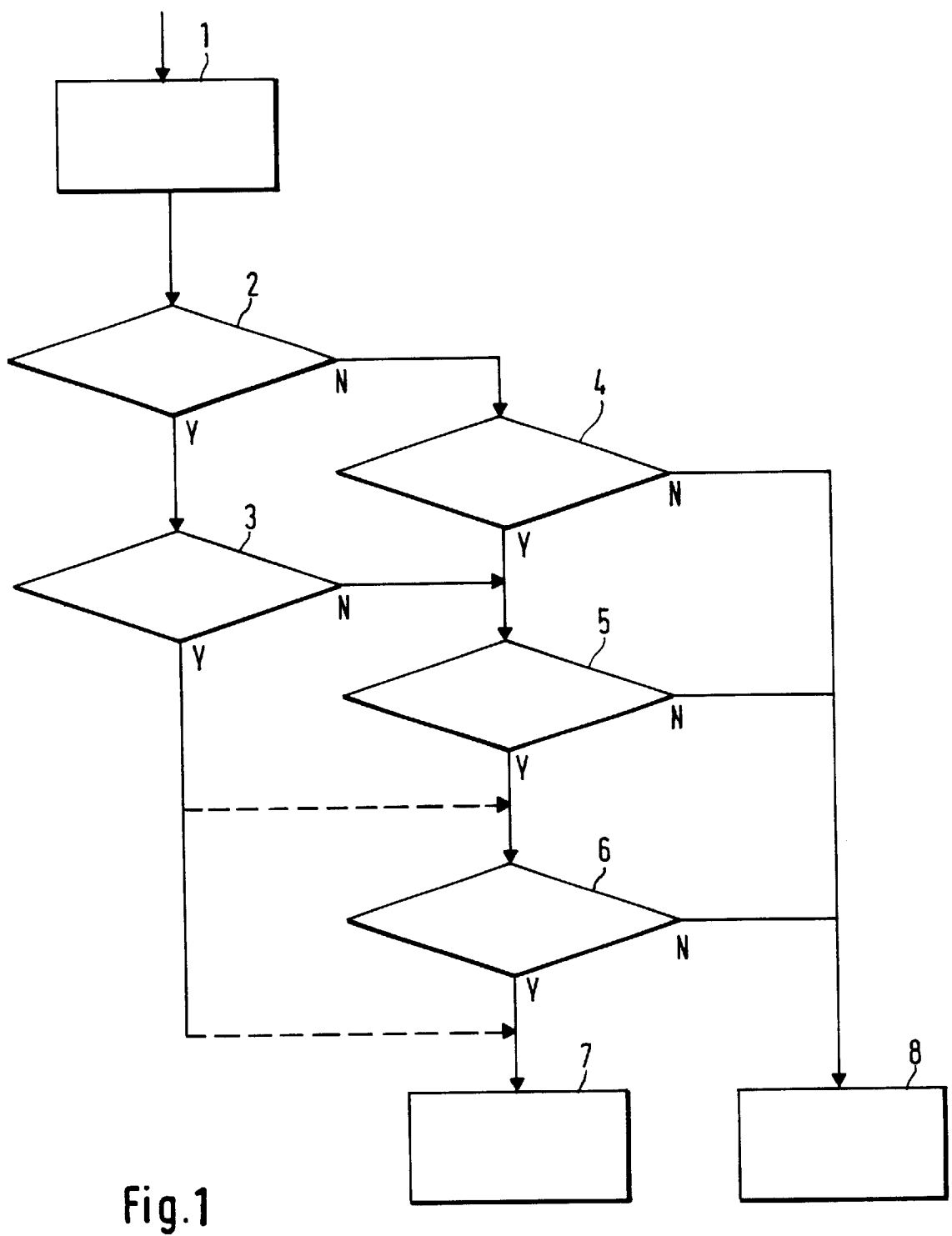

In the flow chart disclosed in FIG. 1 the following blocks have the following meaning:

1—In said telecommunication system comprising said first device, said second device needs to be coupled to said first device (1—coupling required);

2—Is a user identified (via smart card or code or voice or finger print etc.) positively or negatively (2—identification), if yes go to 3, if no go to 4;

3—Is a user identification of a high security level or of a low security level (3—security level), if high (yes) go to 6 or 7, if no go to 5;

4—Is a first authorisation phase/code correct (4—first authorisation), if yes go to 5, if no go to 8;

5—Is a second authorisation phase/code correct (5—second authorisation), if yes go to 6, if no go to 8;

6—Is a third authorisation phase/code correct (6—third authorisation), if yes go to 7, if no go to 8;

7—Authorisation ok (in case of positive identification, no authorisation required (from 3 to 7) or sufficient authorisation ok (from 3 to 7 via 5 and/or 6), in case of negative identification, complete authorisation ok (from 2 to 7 via 4, 5 and 6)), devices may be coupled (7—ok);

8—Authorisation not ok (in case of positive identification, said sufficient authorisation not ok (from 3 to 8 via 5 or 6), in case of negative identification, complete authorisation not ok (from 2 to 8 via 4, 4,5 or 4,5,6)), devices are not to be coupled (8—not ok).

In view of the flow chart in FIG. 1, the method according to the invention functions as follows. In said telecommunication system, said first device is for example a DECT-basestation already coupled to a first handset, and a second device in the form of a second handset needs to be coupled to said system, for which authorisation is required (1), to prevent unauthorised calling. Thereto, a user identity is checked (2), either by asking said user to identify himself (via smart card or code or voice or finger print etc.) or by checking a user identification made in the past but still valid. In case of a negative identification, all authorisation phases/codes need to be checked, the first one (4), the second one (5), the third one (6), if all three are correct, authorisation is ok and said devices may be coupled (7), for example wirelessly, to be used, if at least one is not correct, authorisation is not ok, devices are not to be coupled (8). In case of a positive identification, for example, the security level is checked (3), which can be, for example, either high (smart card or finger print) or low (code or voice); In case of a high level security, either no further authorisation is required at all and devices may be coupled (7), for example wirelessly, to be used, or only the third authorisation phase/code needs to be checked (6), if correct, authorisation is ok and said devices may be coupled (7), for example wirelessly, to be used. In case of a low level security, only the second and third authorisation phases/codes need to be checked, if both are correct, authorisation is ok and said devices may be coupled (7), for example wirelessly, to be used, if at least one is not correct, authorisation is not ok, devices are not to be coupled (8). Said identification and/or authorisation could be done only once, for example to introduce a new device to an existing device/system, or regularly, for example each day or week, or each time said new device is to be used.

Figure 2:
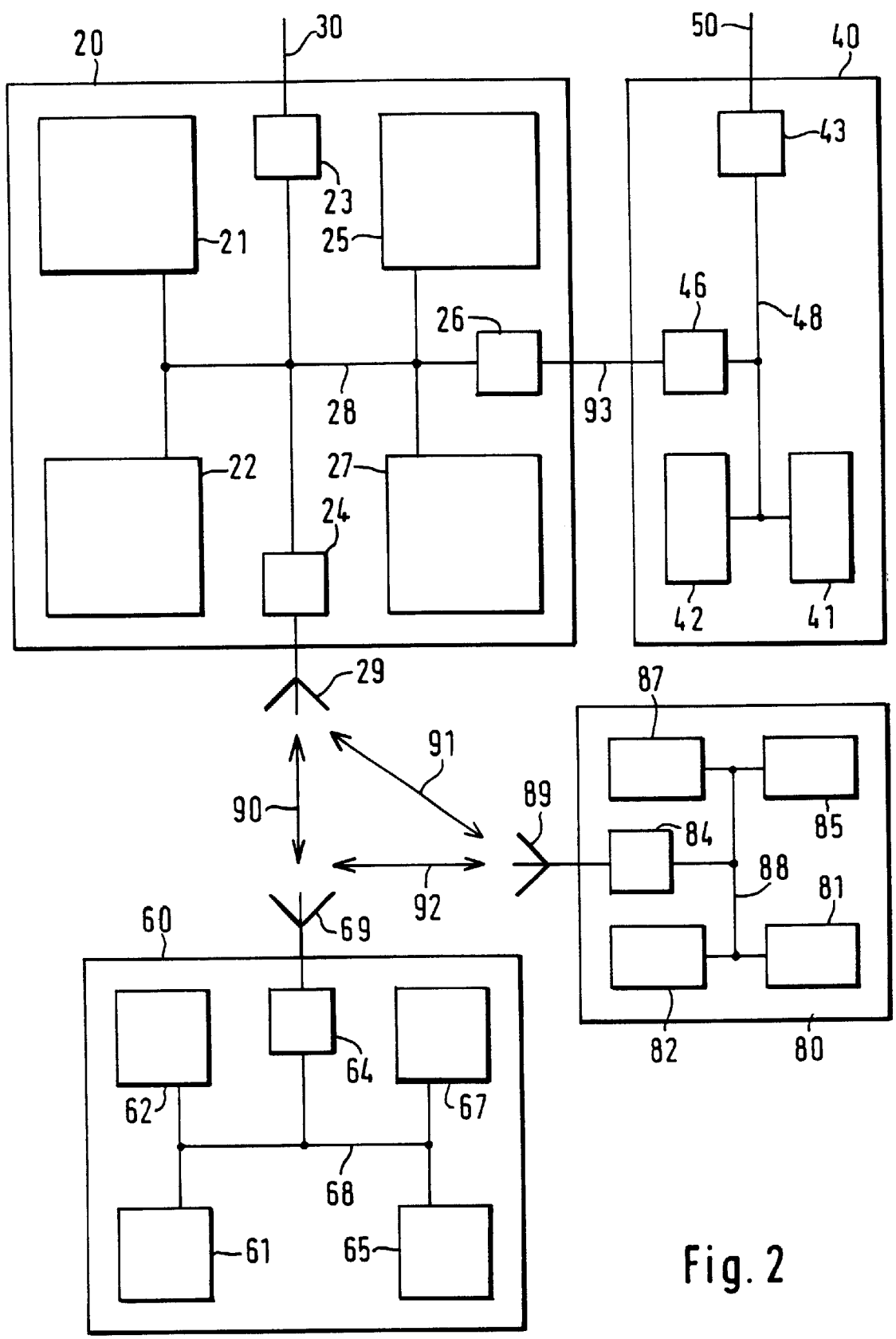

The telecommunication system according to the invention disclosed in FIG. 2 comprises a first device 20 to be coupled to a second device 60 via a wireless connection 90 and coupled to a third device 80 via a wireless connection 91 and coupled to a fourth device 40 via a wired connection 93. Second device 60 and third device 80 could be coupled via a wireless connection 92.

First device 20 comprises a bussystem 28 for coupling processor 21, memory 22, man-machine-interface 25 (like for example a keyboard/display), identification/authorisation processor 27, network interface 23 coupled to connection 30, system interface 26 coupled to connection 93, and transceiver 24 coupled to antennae 29 for said wireless connections 90 and 91.

Second device 60 comprises a bussystem 68 for coupling processor 61, memory 62, man-machine-interface 65 (like for example a keyboard/display), identification/authorisation processor 67, and transceiver 64 coupled to antennae 69 for said wireless connections 90 and 92.

Third device 80 comprises a bussystem 88 for coupling processor 81, memory 82, man-machine-interface 85 (like for example a keyboard/display), identification/authorisation processor 87, and transceiver 84 coupled to antennae 89 for said wireless connections 91 and 92.

Fourth device 40 comprises a bussystem 48 for coupling processor 41, memory 42, and network interface 43 coupled to connection 50.

The telecommunication system according to the invention disclosed in FIG. 2 functions as follows.

According to a first embodiment, first device 20 is for example a DECT-base-station to be coupled to second device 60 which is for example a DECT-handset via wireless connection 90 and coupled to third device 80 which is for example a DECT-handset via wireless connection 91 and coupled to fourth device 40 which is for example a controller or a gateway/server of a Digital Home Network via connection 93. First device 20 and third device 80 already know each other (for example due to being bought together) and are able to communicate with each other. First device 20 is coupled to fourth device 40 via connection 93, and could further be coupled to a network via connection 30. Second device 60 is new, and needs introduction and authorisation before it is able to communicate with for example first device 20. According to prior art, this was done by entering manufacturer codes via man-machine-interface 25 and/or man-machine-interface 65, for example a long first manufacturer code (block 4 in FIG. 1) entered via man-machine-interface 25 and/or man-machine-interface 65, after which a first communication between devices 20 and 60 takes place via wireless connection 90, then for example a long second manufacturer code (block 5 in FIG. 1) entered via man-machine-interface 25 and/or man-machine-interface 65, after which a second communication between devices 20 and 60 takes place via wireless connection 90, and then for example a short confirmation code (block 6 in FIG. 1) entered via man-machine-interface 25 and/or man-machine-interface 65, after which a third communication between devices 20 and 60 takes place via wireless connection 90. This way for introducing two devices to one another is time-consuming and user-unfriendly.

According to the invention, as soon as it has become clear that device 60 needs to be introduced to device 20 (for example when device 20 has received an introduction-signal either entered by a user via man-machine-interface 25 or received via transceiver 24 and wireless connection 90 or received via network interface 23 or system interface 26) a user identity is checked (block 2 in FIG. 1), either by asking said user (which question for example could be shown on man-machine-interface 25 or could be asked by generating speech via a loudspeaker forming part of man-machine-interface 25) to identify himself (via a smart card to be read by a smart card reader forming part of man-machine-interface 25 or a code to be entered via man-machine-interface 25 or voice to be received via a microphone forming part of man-machine-interface 25 or a finger print to be read by a finger print reader forming part of man-machine-interface 25 etc.) or by checking a user identification made in the past but still valid. This identification process is for example managed by identification/authorisation processor 27 (possibly in cooperation with memory 22), whereby processor 21 in controls memory 22 and man-machine-interface 25 and (for example in response to said introduction-signal) activates and/or controls identification/authorisation processor 27. In case of a negative identification (no identification generated and/or found within a certain time-limit or an incorrect identification generated), all authorisation phases/codes need to be checked, the first one being said long first manufacturer code (block 4 in FIG. 1), the second one being said long second manufacturer code (block 5 in FIG. 1), the third one being said short confirmation code (block 6 in FIG. 1), if all three are correct, authorisation is ok and said devices have been introduced to one another (block 7 in FIG. 1), if at least one is not correct, authorisation is not ok, devices are not to be coupled (block 8 in FIG. 1). In case of a positive identification, for example, the security level is checked (block 3 in FIG. 1), which can be, for example, either high (in dependence of the kind of identification: smart card or finger print, or in dependence of the person being identified) or low (in dependence of the kind of identification: code or voice, or in dependence of the person being identified); In case of a high level security, either no further authorisation is required at all and devices may be coupled (block 7 in FIG. 1), or only the third authorisation phase/code needs to be checked (block 6 in FIG. 1), if correct, authorisation is ok and said devices may be coupled (block 7 in FIG. 1). In case of a low level security, only the second and third authorisation phases/codes need to be checked, if both are correct, authorisation is ok and said devices may be coupled (block 7 in FIG. 1), if at least one is not correct, authorisation is not ok, devices are not to be coupled (block 8 in FIG. 1). Said identification and/or authorisation could be done only once, for example to introduce a new device to an existing device/system, or regularly, for example each day or week, or each time said new device is to be used. Therefore, the generation of said introduction signal could be done by a user and/or automatically at any location possible.

According to a first alternative to said first embodiment, instead of using man-machine-interface 25, for one or more of all described functions of man-machine-interface 25, man-machine-interface 65 (including a possible loudspeaker, smart card reader, microphone, finger print reader etc.) is used, whereby signals will have to be exchanged via wireless connection 90.

According to a second alternative to said first embodiment, instead of using identification/authorisation processor 27, for one or more of all described functions of identification/authorisation processor 27, identification/authorisation processor 67 is used, whereby signals will have to be exchanged via wireless connection 90.

According to a third alternative to said first embodiment, identification/authorisation processor 27 (67) consists of two separate processors, an identification processor and an authorisation processor, whereby each one of them can be partly or completely integrated with processor 21 (61).

According to a fourth alternative to said first embodiment, for one or more of all described functions of man-machine-interface 25, and/or for one or more of all described functions of identification/authorisation processor 27, said function is performed by device 40 (whereby signals will have to be exchanged via connection 93) or inside a network (whereby signals will have to be exchanged via connection 30 and/or 50).

According to a second embodiment, first device 20 is for example a controller or a gateway/server of a Digital Home Network or DHN and is coupled to fourth device 40 via connection 93, and could further be coupled to a network via connection 30. Fourth device 40 is for example a device belonging to said DHN, like a PC, TV, VRC, refrigerator, security system, etc., and could further be coupled to a network via connection 50. Second device 60 is for example a DECT-base-station coupled to third device 80 which is for example a DECT-handset via wireless connection 91. First device 20 and fourth device 40 already know each other (for example due to being bought together and/or due to being introduced to one another) and are able to communicate with each other. Second device 60 and third device 80 already know each other (for example due to being bought together), but in said DHN, the combination of device 60 and device 80 is new, and needs introduction and authorisation before this combination is able to communicate with for example first device 20.

According to the invention, as soon as it has become clear that devices 60 and 80 need to be introduced to device 20 (for example when device 20 has received an introduction-signal either entered by a user via man-machine-interface 25 or received via transceiver 24 and wireless connection 90 and/or 91 or received via network interface 23 or system interface 26) a user identity is checked (block 2 in FIG. 1), either by asking said user (which question for example could be shown on man-machine-interface 25 or could be asked by generating speech via a loudspeaker forming part of man-machine-interface 25) to identify himself (via a smart card to be read by a smart card reader forming part of man-machine-interface 25 or a code to be entered via man-machine-interface 25 or voice to be received via a microphone forming part of man-machine-interface 25 or a finger print to be read by a finger print reader forming part of man-machine-interface 25 etc.) or by checking a user identification made in the past but still valid. This identification process is for example managed by identification/authorisation processor 27 (possibly in cooperation with memory 22), whereby processor 21 in controls memory 22 and man-machine-interface 25 and (for example in response to said introduction-signal) activates and/or controls identification/authorisation processor 27. In case of a negative identification, all authorisation phases/codes need to be checked, if all three are correct, authorisation is ok and both devices 60 and 80 have been introduced to device 20 (block 7 in FIG. 1), if at least one is not correct, authorisation is not ok, devices are not to be coupled (block 8 in FIG. 1). In case of a positive identification, for example, the security level is checked, which can be, for example, either high or low. In case of a high level security, either no further authorisation is required at all and devices may be coupled (block 7 in FIG. 1), or only the third authorisation phase/code needs to be checked, if correct, authorisation is ok and said devices may be coupled (block 7 in FIG. 1). In case of a low level security, only the second and third authorisation phases/codes need to be checked, if both are correct, authorisation is ok and said devices may be coupled (block 7 in FIG. 1), if at least one is not correct, authorisation is not ok, devices are not to be coupled (block 8 in FIG. 1). Said identification and/or authorisation could be done only once, for example to introduce a new device to an existing device/system, or regularly, for example each day or week, or each time said new device is to be used. Therefore, the generation of said introduction signal could be done by a user and/or automatically at any location possible.

According to a first alternative to said second embodiment, instead of using man-machine-interface 25, for one or more of all described functions of man-machine-interface 25, man-machine-interface 65 and/or 85 (including a possible loudspeaker, smart card reader, microphone, finger print reader etc.) is used, whereby signals will have to be exchanged via wireless connection 90 and/or 91.

According to a second alternative to said second embodiment, instead of using identification/authorisation processor 27, for one or more of all described functions of identification/authorisation processor 27, identification/authorisation processor 67 and/or 87 is used, whereby signals will have to be exchanged via wireless connection 90 and/or 91.

According to a third alternative to said second embodiment, identification/authorisation processor 27 (67, 87) consists of two separate processors, an identification processor and an authorisation processor, whereby each one of them can be partly or completely integrated with processor 21 (61, 81).

According to a fourth alternative to said second embodiment, for one or more of all described functions of man-machine-interface 25, and/or for one or more of all described functions of identification/authorisation processor 27, said function is performed by device 40 (whereby signals will have to be exchanged via connection 93) or inside a network (whereby signals will have to be exchanged via connection 30 and/or 50).

According to a fifth alternative to said second embodiment, both devices 60 and 80 need to be introduced to device 20 separately, or device 60 needs to be introduced to device 20, after which device 80 needs to be introduced to device 60 (in case they did not know each other and had not yet been introduced to one According to a third embodiment, first device 20 is for example a GSM/DCS/CTS-base-station, coupled to fourth device 40 via connection 93, and could further be coupled to a network via connection 30. Fourth device 40 is for example a GSM/DCS/CTS-mobile-switching-center, and could further be coupled to a network via connection 50. Second device 60 is for example a GSM/DCS/CTS-handset. First device 20 and fourth device 40 already know each other (for example due to being introduced to one another) and are able to communicate with each other. Second device 60 is new, and needs introduction and authorisation before this device 60 is able to communicate with for example first device 20.

According to the invention, as soon as it has become clear that device 60 needs to be introduced to device 20 (for example when device 20 has received an introduction-signal either entered via man-machine-interface 25 or received via transceiver 24 and wireless connection 90 or received via network interface 23 or system interface 26) a user identity is checked (block 2 in FIG. 1), either in/near device 20 (in case said user possibly will have to appear near device 20)

by asking (which question for example could be shown on man-machine-interface 25 or could be asked by generating speech via a loudspeaker forming part of man-machine-interface 25) to identify said user (via a smart card to be read by a smart card reader forming part of man-machine-interface 25 or a code to be entered via man-machine-interface 25 or voice to be received via a microphone forming part of man-machine-interface 25 or a finger print to be read by a finger print reader forming part of man-machine-interface 25 etc.) or near device 60 (in case said user does not have to appear near device 20) by asking (which question for example could be shown on man-machine-interface 65 or could be asked by generating speech via a loudspeaker forming part of man-machine-interface 65) to identify said user (via a smart card to be read by a smart card reader forming part of man-machine-interface 65 or a code to be entered via man-machine-interface 65 or voice to be received via a microphone forming part of man-machine-interface 65 or a finger print to be read by a finger print reader forming part of man-machine-interface 65 etc.) or by checking a user identification made in the past but still valid. This identification process is for example managed by identification/authorisation processor 27 and/or 67 (possibly in cooperation with memory 22 and/or 62), whereby processor 21 and/or 61 controls memory 22 and/or 62 and man-machine-interface 25 and/or 65 and (for example in response to said introduction-signal) activates and/or controls identification/authorisation processor 27 and/or 67. In case of a negative identification, a large authorisation phase/code (for example chip-card present in handset+long code to be entered+small code to be entered) needs to be checked, if correct, authorisation is ok and device 60 has been introduced to device 20 (block 7 in FIG. 1), if not correct, authorisation is not ok, devices are not to be coupled (block 8 in FIG. 1). In case of a positive identification, for example, the security level is checked, which can be, for example, either high or low. In case of a high level security, either no further authorisation is required at all and devices may be coupled (block 7 in FIG. 1), or only a small authorisation phase/code (for example small code to be entered) needs to be checked, if correct, authorisation is ok and said devices may be coupled (block 7 in FIG. 1). In case of a low level security, only an average authorisation phase/code (for example chip card present in handset+small code to be entered or for example long code to be entered+small code to be entered) needs to be checked, if correct, authorisation is ok and said devices may be coupled (block 7 in FIG. 1), if not correct, authorisation is not ok, devices are not to be coupled (block 8 in FIG. 1). Said identification and/or authorisation could be done only once, for example to introduce a new device to an existing device/system, or regularly, for example each day or week, or each time said new device is to be used. Therefore, the generation of said introduction signal could be done by a user and/or automatically at any location possible. Of course, some particular communication via wireless connection 90 will be generally necessary before introduction has been completed to perform an identification and/or authorisation process. This particular communication could for example be allowed by a network manager for a limited amount of time and only for particular purposes and to particular addresses/destinations etc.

According to a first alternative to said third embodiment, identification/authorisation processor 27 (67) consists of two separate processors, an identification processor and an authorisation processor, whereby each one of them can be partly or completely integrated with processor 21 (61).

According to a second alternative to said third embodiment, for one or more of all described functions of man-machine-interface 25, and/or for one or more of all described functions of identification/authorisation processor 27, said function is performed by device 40 (whereby signals will have to be exchanged via connection 93) or inside a network (whereby signals will have to be exchanged via connection 30 and/or 50). another) etc.

According to a fourth embodiment, first device 20 is for example a car radio without a front and to be coupled to fourth device 40 via connection 93. Fourth device 40 is for example said front. Second device 60 and third device 80 are for example transmitting radio stations. To prevent an unauthorised user operating said car radio 20, front 40 needs introduction/authorisation before it is able to communicate with car radio 20 (without said front and said introduction/authorisation said car radio cannot be used for receiving radio signals and/or playing cd's and cassette tapes). According to prior art, this was done by entering a keycode via man-machine-interface 25 and/or man-machine-interface 45 not shown. This way for introducing two devices to one another is time-consuming and user-unfriendly.

According to the invention, as soon as front 40 has been coupled to car radio 20) a user identity is checked, either in/near device 20 by asking (which question for example could be shown on man-machine-interface 25 or 45 not shown or could be asked by generating speech via a loudspeaker forming part of man-machine-interface 25 or 45 not shown) to identify said user (via for example voice to be received via a microphone forming part of man-machine-interface 25 or 45 not shown or a finger print to be read by a finger print reader forming part of man-machine-interface 25 or 45 not shown etc.) or by checking a user identification made in the past but still valid (for example the identification between the motor management system and the ignition key). This identification process is for example managed by identification/authorisation processor 27 and/or 47 not shown (possibly in cooperation with memory 22 and/or 42), whereby processor 21 and/or 41 controls memory 22 and/or 42 and man-machine-interface 25 and/or 45 not shown and activates and/or controls identification/authorisation processor 27 and/or 47 not shown. In case of a negative identification (voice/finger print unclear, or no ignition key coupled to motor management system) said keycode needs to be checked, if correct, authorisation is ok and front 40 has been introduced to car radio 20 (block 7 in FIG. 1), if not correct, authorisation is not ok, devices are not to be coupled (block 8 in FIG. 1). In case of a positive identification, for example, no further authorisation is required at all and devices may be coupled (block 7 in FIG. 1), or only a smaller keycode needs to be entered and checked, if correct, authorisation is ok and said devices may be coupled (block 7 in FIG. 1), if not correct, authorisation is not ok, devices are not to be coupled (block 8 in FIG. 1). Said identification and/or authorisation could be done only once, for example to introduce a new device to an existing device/system, or regularly, for example each day or week, or each time said new device is to be used.

In view of this fourth embodiment, according to an alternative, a car can only be started in case of (for example but not necessarily) the right key being used, together with a long security code being entered, whereby according to the invention in case of a driver having identified himself positively, of said long security code only a part has still to be entered, or a completely different, shorter security code, or even no code at all.

Said invention could further be extended with a detector for detecting a unit for identifying a user functioning properly or not, whereby in case of detection of said unit not functioning properly, automatically a unit for authorising is ordered to request full authorisation (instead of a partly authorisation after a positive identification).

All embodiments are just embodiments and do not exclude other embodiments not shown and/or described. All alternatives are just alternatives and do not exclude other alternatives not shown and/or described. Each embodiment (and/or parts thereof can be combined with each other embodiment (and/or parts thereof, and each alternative (and/or parts thereof can be combined with each other alternative (and/or parts thereof) belonging to the some or a different embodiment.

What is claimed is:

1. A method for making a decision for authorization of communication between at least two devices in a telecommunications system, the method including at least two options for gaining the authorization of communication;
    a first of said options requiring a first identification process that identifies a user and verifies the user as possessing a high-level security, and
    a second of said options requiring a second identification process, wherein the user remains unidentified, said second option further requiring a first authorization process, said first authorization process requiring correct entry of at least two authorization codes.

2. The method of claim 1, wherein said first authorization process requires correct entry of at least three authorization codes.

3. The method of claim 1, further including a third option for gaining the authorization of communication,
    said third option requiring a third identification process that identifies the user but does not verify the user as possessing a high-level security, said third option further requiring a second authorization process, said second authorization process requiring correct entry of at least one authorization code.

4. The method of claim 3, wherein said second authorization process requires correct entry of at least two authorization codes.

5. The method of claim 3, further including a fourth option for gaining the authorization of communication,
    said fourth option requiring said first identification process and further requiring a third authorization process, said third authorization process requiring correct entry of an authorization code.

6. A telecommunication system including a receiver and processor for making a decision for authorization of communication between at least two devices in the telecommunications system, the processor providing at least two options for gaining the authorization of communication;
    a first of said options requiring a first identification process that identifies a user and verifies the user as possessing a high-level security, and
    a second of said options requiring a second identification process, wherein the user remains unidentified, said second option further requiring a first authorization process, said first authorization process requiring correct entry of at least two authorization codes.

7. The telecommunication system of claim 6, wherein said first authorization process requires correct entry of at least three authorization codes.

8. The telecommunications system of claim 6, further including a third option for gaining the authorization of communication,
    said third option requiring a third identification process that identifies the user but does not verify the user as possessing a high-level security, said third option further requiring a second authorization process, said second authorization process requiring correct entry of at least one authorization code.

9. The telecommunication system of claim 8, wherein said second authorization process requires correct entry of at least two authorization codes.

10. The telecommunications system of claim 8, further including a fourth option for gaining the authorization of communication,
    said fourth option requiring said first identification process and further requiring a third authorization process, said third authorization process requiring correct entry of an authorization code.

11. The telecommunications system of claim 10, wherein said at least two devices comprise a first transceiver and a second transceiver for exchanging signals.

12. The telecommunications system of claim 11, further comprising a network coupled to one of said at least two devices.

13. A device comprising a first device to be coupled to a second device in a telecommunications system, the first device including a processor for making a decision for authorization of coupling between the first and second device, the processor providing at least two options for gaining the authorization of coupling;
    a first of said options requiring a first identification process that identifies a user of the second device and verifies the user of the second device as possessing a high-level security, and
    a second of said options requiring a second identification process, wherein the user of the second device remains unidentified, said second option further requiring a first authorization process, said first authorization process requiring correct entry of at least two authorization codes.

14. The device of claim 13, wherein said first authorization process requires correct entry of at least three authorization codes.

15. The device of claim 13, further including a third option for gaining the authorization of coupling,
    said third option requiring a third identification process that identifies the user but does not verify the user as possessing a high-level security, said third option further requiring a second authorization process, said second authorization process requiring correct entry of at least one authorization code.

16. The device of claim 15, wherein said second authorization process requires correct entry of at least two authorization codes.

17. The device of claim 15, further including a fourth option for gaining the authorization of coupling,
    said fourth option requiring said first identification process and further requiring a third authorization process, said third authorization process requiring correct entry of an authorization code.

18. The device of claim 17, wherein said at least two devices comprise a first transceiver and a second transceiver for exchanging signals.

19. The device of claim 18, further comprising a network coupled to one of said at least two devices.

* * * * *